May 4, 1954  G. E. SORENSEN  2,677,186
DIMENSION AVERAGING MEASURING INSTRUMENT
Filed Jan. 31, 1950  3 Sheets-Sheet 1
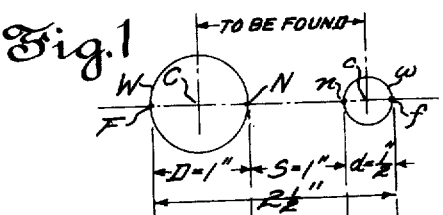
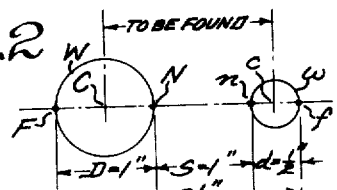
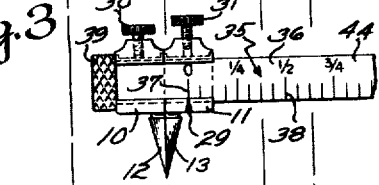
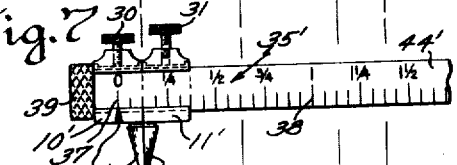
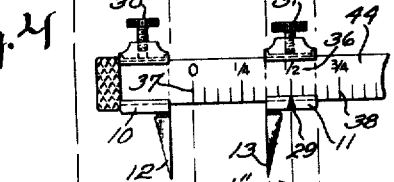
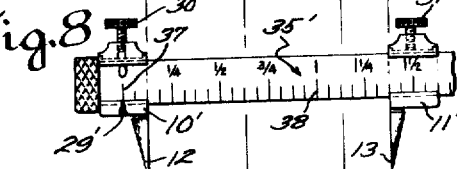
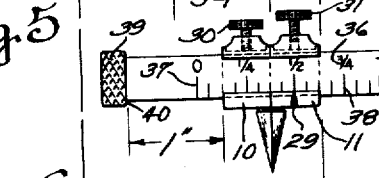
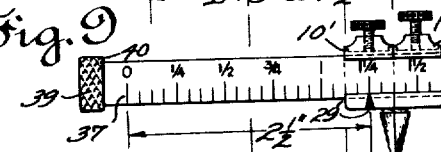
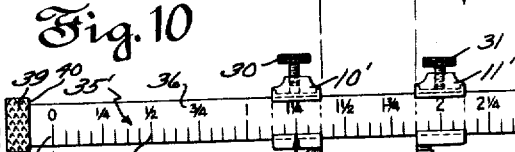
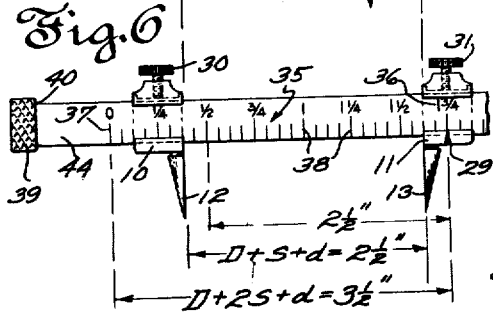
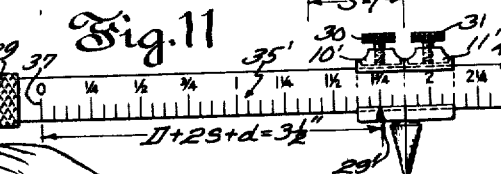
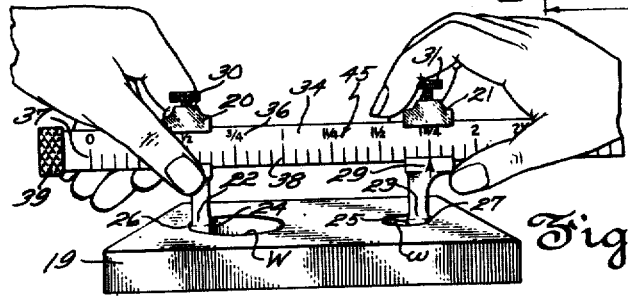
INVENTOR
George E. Sorensen
BY
ATTORNEY

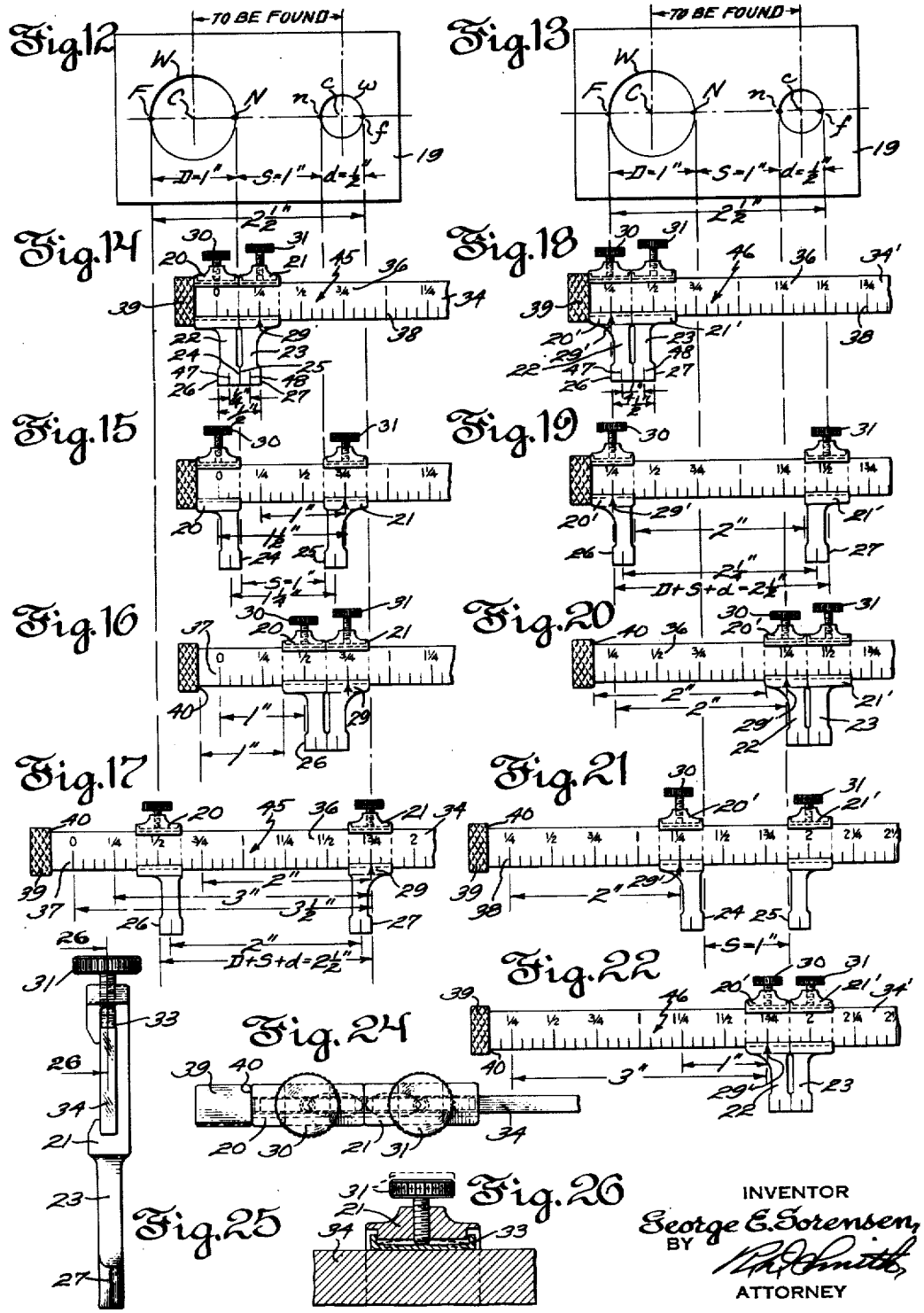

May 4, 1954   G. E. SORENSEN   2,677,186
DIMENSION AVERAGING MEASURING INSTRUMENT
Filed Jan. 31, 1950   3 Sheets-Sheet 3
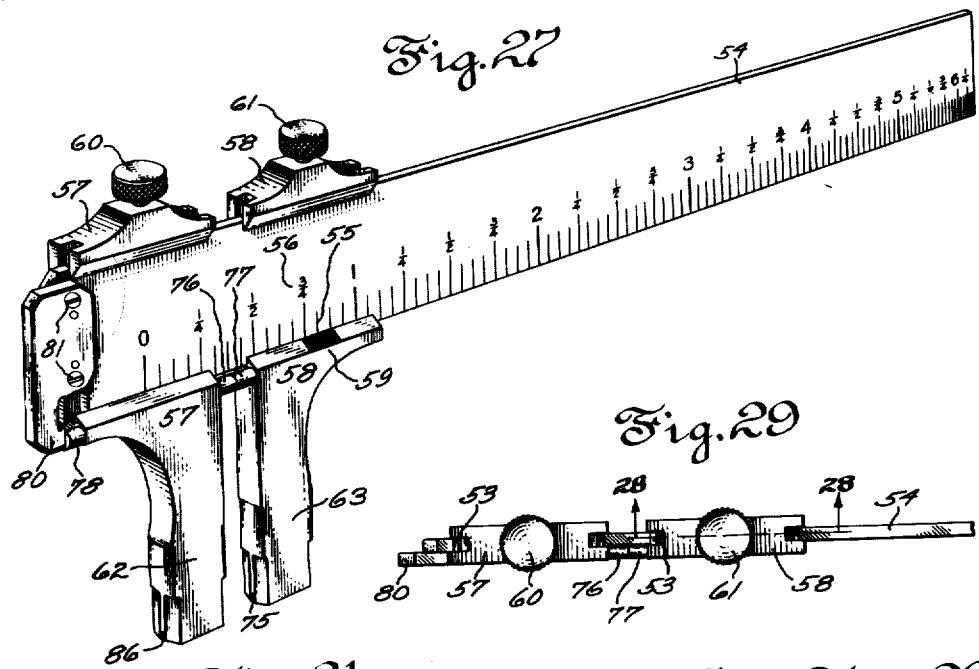
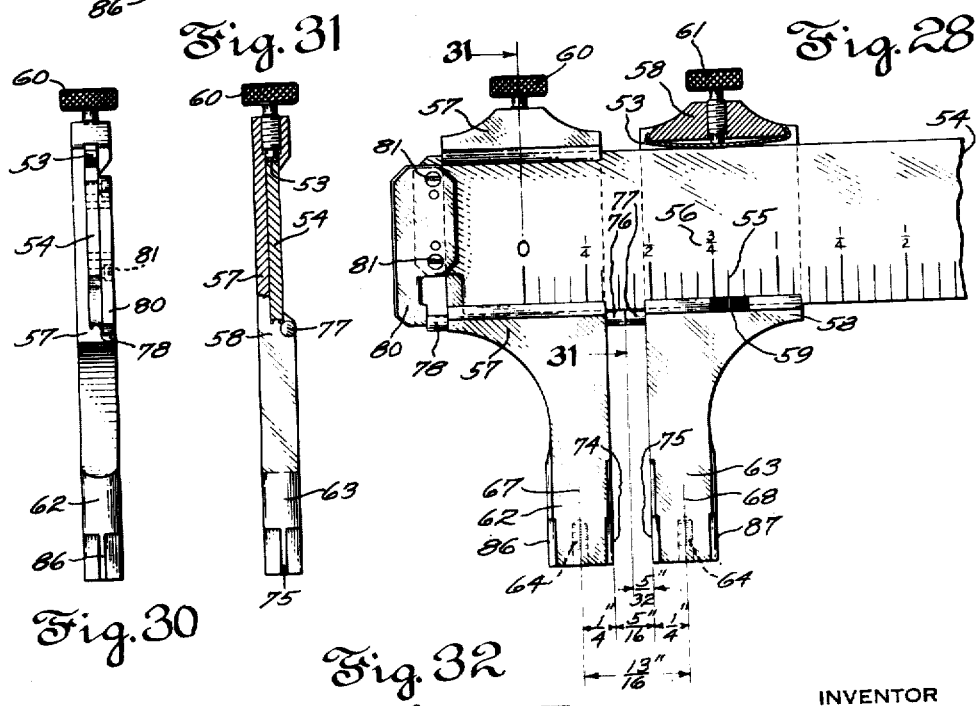
INVENTOR
George E. Sorensen,
BY
ATTORNEY Patented May 4, 1954

2,677,186

UNITED STATES PATENT OFFICE 2,677,186

DIMENSION AVERAGING MEASURING INSTRUMENT

George E. Sorensen, Fairfield, Conn.

Application January 31, 1950, Serial No. 141,448

13 Claims. (Cl. 33—143)

This invention relates to work sensing or calipering instruments affording direct reading of the true measure of distance between two unmarked loci, such as the unmarked centers of two eccentrically related circles or round holes and without knowing or having to ascertain the sizes of the holes. Diametrically opposite edges of one such hole may be termed a first pair of discernible marks between which lies one of the hole centers or unmarked loci, while diametrically opposite edges of the other hole may be termed a second pair of discernible marks between which the other hole center or unmarked locus lies.

It is a general purpose of the invention to provide a calipering instrument which will produce a direct reading of the true center spacing or distance between such hole centers or unmarked loci without resort to mental computation and as a result of merely calipering successively certain distances between the aforesaid discernible marks. For instance, the calipers may be set to span the distance between the nearest together hole edges and as a separate operation set to span the distance between the farthest apart hole edges. This latter distance will overlap and be inclusive of the first said distance. When these two steps have been performed and because of the overlapping of the two distances referred to, what has actually been calipered is the sum of the diameters of the two holes plus twice the distance, if any, that separates the two holes. In order to register a direct reading of the true center spacing of the two holes the instrument is calibrated to register one half the total distances that are actually calipered by the instrument. In the example referred to, the instrument will register the sum of the radii of the two holes plus the distance, if any, by which the holes are separated, this sum being the desired direct reading of the center spacing of the holes. Such sum is also the average of the distance between the nearest together hole edges and the distance between the farthest apart hole edges.

The present improvements involve simplification in the number and complexity of parts and in the number of manipulative operations required by certain instruments for a comparable purpose disclosed in my copending application, Serial No. 28,368, filed May 21, 1948. The use of those instruments necessitated an extraneous step of mechanically correcting the registering of a false dimensional magnitude additional to two successive calipering operations before the instrument could ultimately be made to register a direct reading of the true distance between the unmarked loci or hole centers.

In this class of measuring instruments I prefer to provide a scale of numerical characters denoting progressive dimensional magnitudes that are fractional proportions of the true accumulative measure of the spacings between the characters. For example, a scale marked with a series of graduations progressing away from the beginning, or "zero" end, of the scale and which are actually ¼" apart may be labelled by characters denoting that they are ⅛" apart so that a character denoting a graduation mark fourth in order away from "zero" will be designated by the fractional magnitude ½" instead of by the true magnitude 1". An instrument equipped with such a scale will give direct readings which may be one half the sum of the actual magnitudes of two work dimensions that are successively calipered in an additive manner by the instrument, or in other words, the average of the number of work dimensions so calipered. Thus if the diameter of a circle or round hole is calipered by an instrument having such a half magnitude scale of characters, the resultant dimensional reading on the instrument will be the radius of the hole. If the added lengths of the diameters of two tangent circles or round holes are measured by a single overall calipering operation the instrument will read a value equal, not to the sum of the diameters of the two holes, but a value equal to the sum of the radii of the holes, such sum obviously being the true distance between the centers of the holes. However, when center distance between two eccentric holes that are spaced apart by some distance is to be ascertained, an instrument of the subject kind cannot be made to read the true distance between the hole centers by means of only a single calipering operation.

It is an object of this invention to enable the true distance between the centers of two eccentric spaced apart holes to be read directly on the instrument as a result of only two successive work calipering steps, eliminating all need for correction of false registration that would involve an extraneous adjustive step in manipulating the instrument additional to two simple work calipering operations.

A further object of the present improvements is to provide an instrument that can give a direct reading of the average magnitude of any two or more overlapping distances by merely calipering such distances successively.

A specific object of the invention is to ascertain by direct reading on a measuring instrument and without mental computation the true distance between centers of two eccentric holes by merely calipering successively the distance between the nearest together edges of the two holes and the distance between the farthest apart edges of the two holes whether such holes are tangent or are separated by a space.

The foregoing and other advantageous uses of the present improvements will become clear in greater particular from the following description of a successful embodiment of the invention, which description has reference to the appended drawings wherein:

Figs. 1 and 2 both illustrate similar pairs of spaced eccentric coplanar circles of illustrative dimensions that may be scribed on any flat work surface and whose center spacing is ascertainable by direct reading on my improved instrument even if the circle centers are unmarked loci on the work.

Figs. 3 to 6, inclusive, show successive steps in maneuvering one form of my improved instrument to produce a direct reading thereon of the distance between centers of the two circles of Fig. 1 without sensing such centers.

Figs. 7 to 11, inclusive, show a different series of successive steps in maneuvering a modified form of the instrument in a manner to arrive at the same direct reading of center distance as in Fig. 6.

Figs. 12 and 13 both illustrate similar pairs of spaced eccentric round holes, of the same dimensions as the mere circles of Figs. 1 and 2, located side by side in a solid work block and whose center spacing can be ascertained with great precision by use of the still further modified forms of my improved instrument shown in Figs. 14 to 22, inclusive.

Figs. 14 to 17, inclusive, show successive steps of maneuvering the modified form of instrument shown in Fig. 14 so as to caliper the edges of the holes of Figs. 12 and 13.

Figs. 18 to 22, inclusive, show a different series of steps in maneuvering a modification of the instrument in Fig. 18 in a manner to arrive at a direct reading of center distance like that in Fig. 17.

Fig. 23 shows a manner of handling the instrument of Figs. 14 to 17, inclusive, making it unnecessary to grasp or use as a handle the beam that carries the readable scale of graduations and indicia characters.

Fig. 24 is an enlarged fragmentary plan view of the instrument of Fig. 23.

Fig. 25 is an endwise view of the instrument looking from the right toward Fig. 24.

Fig. 26 is a fragmentary view taken in section on the plane 26—26 in Fig. 25 showing a conventional detail of construction of spring gib for applying the jaw locking pressure of the thumb screw against the beam edge.

Fig. 27 is a perspective view showing in suitable actual size refinements in preferred construction of an instrument embodying the invention advantageous for use in any of the manners herein disclosed with respect to diagrammatic Figs. 1 to 22, inclusive.

Fig. 28 is a fragmentary face view of the instrument in Fig. 27 in suitable actual size showing some of the parts in section on the plane 28—28 in Fig. 29, looking in the direction of the arrows.

Fig. 29 is an edgewise plan view of the instrument in Fig. 28.

Fig. 30 is an endwise view looking from the left at Fig. 29.

Fig. 31 is a view taken in section on the planes 31—31 in Fig. 28 looking in the direction of the arrows.

Fig. 32 is a bottom plan view drawn on an enlarged scale looking upward at the ends of the calipering legs in Fig. 28.

In describing a successful embodiment of the present improvements the method of using the improved instrument is illustrated diagrammatically in four series of drawing figures. In Figs. 1 to 11, inclusive, there are represented progressive steps in the setting of two differing forms of the instrument suitable for ascertaining the center spacing of eccentric circles W, w merely scribed on paper or on a metal surface. Here the movable instrument jaws 10, 11 carry work sensing terminal portions or legs 12 and 13 whose work contacting terminals are sharp points that coincide theoretically when the instrument parts are positioned as in Fig. 3. Figs. 12 to 22 illustrate corresponding steps in the setting of modified forms of the instrument suitable for ascertaining center spacing of spaced apart holes located side by side in a work block 19 and where the relatively movable instrument jaws 20, 21 carry legs 22, 23 capable of calipering the edges of the holes by abutting contact therewith. Legs 22, 23 possess width in their terminal portions preventing at least two of their work sensing terminals 26, 27 from coinciding in Fig. 14. Two others of the work sensing terminals 24, 25 of legs 22, 23 are able to coincide theoretically in the starting condition of the instrument shown in Fig. 14. In accordance with conventional practice in an instrument intended for calipering round holes, each terminal 24, 25, 26 and 27 is of more abrupt rounded curvature than the circumference of a circle having a diameter equal to the distance between terminals 26 and 27.

The median of width of the leg, as the term "median" is herein used, is a reference point 47, 48, 67 or 68 on each leg which may or may not be visibly marked thereon and which in case of the spaced apart work sensing terminals 24, 26 or 25, 27 in Figs. 12–22 or in case of the work sensing terminals 74, 86 or 75, 87 in Figs. 27–32 is located midway between such work sensing terminals on each leg or terminal portion of the jaw. But in Figs. 1–11, the calipering legs 12, 13 possess single pointed ends which serve as their work sensing terminals. Hence theoretically such terminals possess no width wherefore the single pointed end of each of legs 12, 13 constitutes the reference point above referred to and that sometimes herein is called a "median of width."

Mechanical construction of an instrument capable of use as diagrammatically indicated in Figs. 14 to 17, inclusive, is illustrated in Figs. 24, 25 and 26 of the drawings. It includes a blank jaw 20 and an indexed jaw 21, the latter carrying the index mark 29. Both of these jaws are slidably engaged with a rigid beam 34 which confines them to rectilinear relative movement for measuring work. Fig. 26 shows in detail a spring gib 33 of conventional construction which transmits the locking pressure of the thumb screw to the beam edge. Beam 34 carries a scale 45 of equally spaced characters 36 which in the form shown are numerals respectively denoting fractional magnitudes of the actual distances of the characters from the beginning or "zero" end of the scale. In other words, the range of the scale begins theoretically with a "zero" mark at location 37 and the characters 36 progress serially away from this beginning of the scale. However, the numerical characters used to designate the graduations 38 denote dimensional magnitudes which are only one half the respective actual distances or true aggregates of spacings of the graduations from the beginning of the scale. Thus the graduation mark which is fourth in order away from "zero" location, and actually spaced ½" away from zero, is denominated by the numerical character ¼". Thus the instrument will give readings of distance on scale 45 which are only one half the true magnitudes of the calipering displacement from each other of jaws 20 and 21 along the scale.

For the particular purposes of this invention, beam 34 is provided with an enlarged flat head 39 having at least one surface roughened to serve as a handle for grasping the beam. Head 39 presents a shoulder 40 in fixed relation to said scale which shoulder is abuttingly engageable by the jaw 20 thereby to limit movement of both jaws 20 and 21 relative to beam 34 in one direction at a location which brings index 29 into register with a predetermined graduation on scale 45. Thereby is predetermined a constant or initial starting relationship of the jaws to each other and to the scale 45 accompanied by a constantly corresponding initial registration of the indicators 29 and 45 before the jaws are displaced to perform a measuring function. Shoulder 40 thus serves mechanically as a stop which, of course, may take other forms.

The elemental form of instrument diagrammatically shown in Figs. 2 to 11, inclusive, is constructed as above described with the exception that the jaws 10 and 11 carry pointers 12 and 13 which are capable of being closed together thus to eliminate the initial spacing apart of terminals 26 and 27.

Because it is simpler to understand some of the principles of operation by consideration of the instrument of Figs. 1 to 6, it will be assumed that (W) and (w) are two eccentric circles scribed on a piece of paper or flat metal surface and separated by a space (S) equal to 1". Diametrically opposite points on circle (W) are designated (F) and (N) respectively. They constitute one pair of discernible marks between which there lies an unknown locus, or center (C) of circle (W). Diametrically opposite points on circle (w) are designated respectively (n) and (f). These constitute a second pair of discernible marks between which lies the unmarked locus or center (c) of the circle (w). It is the function of my improved instrument to register for direct reading the actual center spacings or distances between centers (C) and (c) without resorting to mental computation and as a result of merely calipering successively the distance between points (N) (n) and the points (F) (f). The following description makes clear how this is accomplished by the novel provision and relationship of beam head 39 to the location of the range of scale 35, such relationship permitting the blank jaw 10 to intervene between the beam head 39 and the indexed jaw 11 so that index 29 will register with the "zero" graduation on the scale in the starting position of parts shown in Fig. 3.

In Fig. 3 the work sensing points or tips of calipering legs 12, 13 on jaws 10, 11, herein also referred to as "reference points" or "medians of width" of the work sensing portions of such jaws are closed together and the thumb screw 30 of blank jaw 10 is tightened and locks that jaw to the beam 44 while thumb screw 31 of jaw 11 remains loose to enable the latter jaw to be slidable along beam 44 for measuring operations. In Fig. 4 for the purpose of sensing the distance (S), jaw 11 has been displaced from jaw 10 a distance equal to one inch which results from placing the work sensing pointers 12 and 13 on the nearest together points (N, n) of circles (W, w) respectively. This causes the index 29 to register with the graduation mark of character ½" on the beam scale 35. Here the thumb screw 31 of jaw 11 is tightened and the thumb screw 30 of jaw 10 is made loose. Loose jaw 10 is then advanced toward the right into abutting contact with tight jaw 11 after which thumb screw 30 is made tight and thumb screw 31 is loosened again. This locks the blank jaw 10 on the beam at a displacement of 1" from its initial position against the beam head 39.

The indexed jaw 11 is now again displaced from the locked blank jaw 10 an extent determined by placing the points of legs 12 and 13 respectively on the farthest apart point (F, f) of the circles (W, w). This second displacement of jaw 11 from jaw 10 includes an increment of movement that is a repetition of the initial amount of movement 1" of jaw 11 toward the right in Fig. 4. In other words this repeated displacement (1") of jaw 11 has been added to a further displacement of jaw 11 which equals the sum of the diameters of circles (W) and (w) so that jaw 11 has now been displaced from its initial or starting position in Fig. 3 to the extent of (D) plus (2S) plus (d), or a total distance of 3½". This results in a scale reading given by the registration of index 29 with the scale character 1¾". This is a direct reading of the true distance between the unmarked centers (C, c) of the circles (W, w) which have never been directly sensed by the points of legs 12 and 13.

In Fig. 7 the work sensing points 12, 13 are closed together as in Fig. 3, but here the index mark 29' is carried on the jaw 10' instead of on the jaw 11', and the location of the range of scale 35' has been modified in relation to the head 39 of beam 44' so that index 29' on jaw 10' can now register with the beginning or zero graduation of the scale when the parts are in their initial or starting position shown in Fig. 7. Here, as in Fig. 3, thumb screw 30 may be tight and the thumb screw 31 loose. As a first step in a differing series of instrument maneuvering work measuring operations the jaw 11' may be displaced a distance equal to (D) plus (S) plus (d), or 2½". At this point thumb screw 31 will be tightened and thumb screw 30 loosened so that indexed jaw 10' may be moved toward the right into abutting contact with the now tight blank jaw 11' as shown in Fig. 9. Index 29' is thus brought into register with the character 1¼". Now thumb screw 30 is tightened and thumb screw 31 loosened so that jaw 11' can again be displaced from jaw 10' to an extent determined by placing the points of legs 12 and 13 in sensing contact with the circle points (N) and (n). This adds into the instrument a second occurrence of the distance, (S) equals 1". Thus when loose indexed jaw 10' is again brought into engagement with the tight blank jaw 11', the index mark 29' as shown in Fig. 11 will be brought into register with the scale character 1¾" as in Fig. 6, this being the true spacing of the unmarked circle centers (C, c). Either (N)—(n) or (F)—(f) may be sensed first.

The calipering form of instrument diagrammatically shown in Figs. 12 to 22, inclusive, is operated like the elemental form of instrument of Figs. 3 to 11 except that the presence in the legs 22, 23 of that width which separates the work sensing terminals 26, 27 necessitates a differently placed relationship of the range of scale 45 to the beam head or stop 39 so that index 29 shall register initially not with "zero" graduation on the scale but with the graduation labelled ¼", this dimension being half the distance between work sensing terminals 26, 27 or in other words that distance indicated by the space between scratch marks 47, 48 diagrammatically represented on the legs 22, 23, respectively, each of which scratch marks is at the median of the width of its respective leg. Such median corresponds to the actual work sensing points of legs 12 and 13 in Figs. 1 to 11. Any separation of the legs 22, 23 will be reflected by a correspondingly increased separation of the scratch marks or medians 47, 48, but due to the fact that there is an initial separation of ¼″ between them the index 29 initially registers that dimension on the scale. This constant of ¼″ will thus automatically be incorporated in all subsequent readings pointed to by the index 29 resulting from progressive movements of jaw 21 along the scale. Thus if the work sensing terminals first be separated to the extent of the distance (S) or 1″ as in Fig. 15, as would occur by calipering the nearest together edges of holes (W) (w) by contact therewith of leg terminals 24, 25, this will leave the scratch marks 47, 48 a distance apart of 1¼″ which is equal to said 1″ movement plus their initial spacing of ¼″. The corresponding registration of index 29 becomes ¾″, this being the sum of ½″, or half separation movement of the jaws, plus the constant ¼″ of initial separation of scratch marks 47, 48. Thus the scale graduation marked ¾″ may appropriately be termed the beginning graduation in this particular form of the invention. Now thumb screw 31 will be tightened and thumb screw 30 loosened to permit bringing loose jaw 20 into abutting contact with tight jaw 21, after which thumb screw 30 is tightened and thumb screw 31 is loosened. Now when the jaw 21 is next separated from jaw 20 into calipering contact with the farthest apart edges (F) (f) of holes (W) (w) as shown in Fig. 23, the scratch marks 47, 48 will not have had their spacing increased by an amount as great as the distance between (F) and (f). Their spacing will fall short of such actual distance to the extent of the ¼″ constant initial separation heretofore referred to which is one half the combined width of legs 22, 23 at their work sensing terminal portions. The resultant reading of the index 29 becomes 1¾″ as is the case in Fig. 6, this being the true distance between the unmarked centers of the holes.

In Figs. 18 to 22, the relation of the range of scale 46 to the beam head 39 is again changed in accordance with the carrying of index 29′ on jaw 20′ instead of on the jaw 21′. In accordance with the manner of manipulation represented in Figs. 7 to 11, the instrument of Figs. 18 to 22 may first have its jaws spread as in Fig. 19 so that its sensing terminals 26, 27 caliper the hole edges (F) and (f). The thumb screw 31 may now be tightened while thumb screw 30 is made loose to permit of bringing indexed jaw 20′ up into contact again with blank jaw 21′. Then thumb screw 30 will be tightened and thumb screw 31 loosened, after which the terminals 24, 25 are set to caliper the hole edges (N) and (n). When indexed jaw 20′ is last brought up into contact with blank jaw 21′, index 29′ will be found to read 1¾″ on the scale as in Fig. 22 indicating directly and truly the center distance of holes (W) (w).

From the described various manners of operating several forms of the improved instrument, it will be realized that the function of the instrument broadly is to space off additively on the scale of the beam by means of the slidable jaws accumulative distances equal to dimensions of work successively measured by the instrument and to indicate the average value of said dimensions by the direct reading of the instrument, thus registering the radial dimensions rather than the actually sensed diametrical dimensions of the circles, and registering a single occurrence of the space (S) between the holes rather than the actual double occurrence which becomes set up in the instrument. In the uses herein illustrated there are but two work dimensions successively measured, these being in one case the work dimension (S) and in the other case the work dimension (D) plus (S) plus (d). The accumulated distance spaced off on the scale equals (D) plus (2S) plus (d). The scale reads one half this accumulative distance, or (½D) plus (S) plus (½d) which is the center distance between the work circles or the holes. In other kinds of work measurement it might be desired to accumulate mechanically on the scale the sum of three or more successive measurements of work dimensions. To cause the scale to give a direct reading of the average of three distances the graduations of the scale will be marked by numerals which denote one third instead of one half the actual distances of the graduations from the beginning of the scale. If four work dimensions are to be successively measured and accumulated on the scale, the graduation characters will denote one quarter of the actual distance of the graduation from the beginning of the scale in order to produce a direct reading of the average of all four measurements that have been accumulated on the scale, etc.

The instrument of Figs. 27 to 32 which embodies the invention is identified in its correspondingly operative parts with the instruments of Figs. 14 to 17 and Figs. 24 to 26 by use in general of reference numerals having corresponding final digits and incorporates refinements of particular advantage in practical shop use. The beam 54 carries the scale of graduations 55 designated by the numerical characters 56.

Slidable on beam 54 are two jaws 57, 58 comparable to jaws 20 and 21 in Fig. 14, either of which jaws may be marked as the indexed jaw if the location of the range of scale 56 is suitably related to the beam stop 80 as herein taught. In Figs. 27 to 32, 58 designates the indexed jaw having the index mark 59, and 57 designates the other or blank jaw.

The spring gib 53 and the thumb screw 61 in each of these jaws may be regarded as conventional while the calipering legs 62 and 63 may advantageously have the shapes indicated in the drawings and may contain centrally in the end of each leg a threaded hole 64 for inserted mounting therein of spacing-off work-sensing pointer terminals comparable to 12 and 13 in Figs. 3 to 11. When such pointers are installed centrally in the end of each leg the work sensing terminal pointers may coincide with the vertical reference lines 67, 68 which are comparable to scratch lines 47, 48 in Figs. 14 to 22.

As differing from the construction of the instrument diagrammed in Figs. 14 to 22, the nearest together work sensing terminals 74 and 75 on legs 62 and 63, respectively, which are comparable to work sensing terminals 24 and 25 in Figs. 14 to 22, are prevented from ever coming directly into contact with each other by the mutually abutting hardened steel projecting stop studs 76 and 77 fixed on jaws 57 and 58, respectively. A similar stop stud 78 is fixed on the opposite or left side of jaw 57 and projects from the latter for abutment against a stop finger 80. This finger may constitute an integral extension of the metal of beam 54 but is herein shown as a separate part fixedly secured against the face of the beam by screws 81. The mutually contacting end surfaces of stop studs 76 and 77, and of stop stud 73 with the stop finger 80, afford easily cleaned areas of minimum size which are so placed as to exert with strongest effect their resistance to strains and shocks of impact occasioned by sliding either jaw into bumping contact with the other jaw or with the stop finger 80. They mutually contact at a most effective point to prevent torque forces tending to make the jaws tilt relatively to each other or relatively to the beam 54 and thus prevent inaccuracies from creeping into the relationship of the actual spacings of the work sensing terminals 74, 75 and the corresponding registration of index 59 with the proper graduation on the beam scale 55.

Legs 62 and 63 possess, in addition to their inner work sensing terminals 74 and 75, outer work sensing terminals 86 and 87, respectively. Since the aforesaid reference line 67 is midway between the work sensing terminals 74 and 86 and the reference line 68 is midway between the work sensing terminals 75 and 87, lines 67 and 68 cannot approach any closer to each other than the minimum spacing of $1\frac{3}{8}''$ represented in Fig. 23. The index 59, therefore, needs to be initially in register with a scale graduation of different value than is the case in Fig. 14. In other words, the constant to be initially registered by the index 59, instead of being merely one half the combined widths of legs 62, 63, becomes said half width of the legs plus the $\frac{5}{16}''$ by which terminals 74, 75 are initially spaced apart. Such constant in an instrument of the dimensions indicated in the drawings will be $\frac{1}{2}''$ plus $\frac{5}{16}''$ or $1\frac{3}{8}''$. It will be noted that this still is the distance that separates the leg centers 67 and 68 in their nearest together relationship. Thus the location of the range of scale 55 in Figs. 27 and 28 will be so changed that index 59 registers initially with the beginning graduation denoting $1\frac{3}{8}''$ on the scale.

The instrument of Figs. 27 to 32 may be used in any of the ways explained diagrammatically in Figs. 1 to 23, and in many other ways which the user will find convenient for mechanically determining the average values of plural measurements or of predetermined fractional parts of such plural measurements by sensing or calipering such measurements successively in any of the manners hereinbefore described.

While circles and round holes have been illustrated as the work to be measured, all forms of the instrument herein disclosed are fully as capable of calipering and indicating the corresponding center distances between other kinds of work shapes such as by calipering the side surfaces or shoulders of spaced apart projections to indicate the distance between the unmarked center loci of such projections or calipering the neighboring sides of a recess and a projection spaced therefrom to indicate the distance between their unmarked center loci, which kinds of work are illustrated in Figs. 23 and 24 of the drawings in my co-pending application, Serial No. 28,368, filed May 21, 1948.

Also as in my said co-pending application I may, by establishing a suitably modified relationship of beam stops 40 or 80 to the location along the beam of the range of the scale markings 35, 35' or 56 on the beam, use instruments constructed and manipulated as herein to indicate as a direct reading on the instrument the true distance from a single known locus such as $(n)$ to an unmarked locus such as $(c)$ by spacing off or successively calipering the distance $(n-N)$ and $(n-F)$. In this case the correct initial register of the index mark on jaws 11 or 10' should be "zero." The correct initial register of the index mark on jaws 21 or 20' should be $\frac{1}{8}''$ and the correct initial register of the index mark on jaw 58 should be $\frac{5}{16}''$ if a constant terminal of the other jaw be always used to sense the known locus $(n)$.

For conveniently shifting the initial register of the index mark, the shoulder 40 provided by head 39 may be constructed to be shiftable to different fixed stations along the beam, or the stop finger 80 may be so constructed. As an alternative there may properly be placed a plurality of index marks on the same jaw in addition to 29, 29' and 59 from all of which marks there can be selected for each different job that index mark whose initial registration on the scale suits the work whose dimensions are to be measured and indicated according to the principles of this invention and as taught in my aforesaid copending application.

The appended claims are directed to and intended to cover all the various workable combinations and sequences of method steps taught herein as well as obvious substitutes for the shapes and relationships of the structural elements of the instrument itself coming within the broadcast fair interpretation of the claim language having reference thereto.

I claim:

1. A dimension finding instrument affording direct reading of distance between unmarked work loci respectively lying midway between one pair of discernible work marks and midway between a different pair of discernible work marks, including in combination, a straight scale beam, a first calipering jaw carrying in fixed relation thereto a reference point at a work sensing terminal portion of said jaw and slidably engaged with said beam in a manner to be confined thereby to rectilinear movement for measuring work, a second calipering jaw carrying in fixed relation thereto a reference point at a work sensing terminal portion of said second jaw and slidably engaged with said beam in a manner to be confined thereby to rectilinear movement relative to said beam into and away from abutting engagement with said first jaw for measuring work, mutually registering relatively movable measurement indicators, one of said indicators comprising an index movable in unison with one of said jaws and the other of said indicators comprising a scale of spaced apart graduations carried by said beam ranging serially away from a beginning graduation of said scale and denominated as dimensional values different from but proportional to the true aggregates of spacings of said graduations from said beginning graduation, and a stop fixed on said beam in predetermined relation to said beginning graduation positioned to be engageable by one of said jaws in only one direction of sliding movement of the latter thereby to limit movement of both said jaws relative to said beam in said direction and to permit free independent sliding movement of both said jaws relative to said beam and relative to each other in the opposite direction, said stop being so located on said beam as to bring said index into register with said beginning graduation when said jaws are mutually engaged while said first jaw engages said stop, and said beginning graduation being denominated as the true dimension of the distance that then intervenes between said respective reference points.

2. A dimension finding instrument as defined in claim 1, in which one of the said jaws carries the said index, and the other of said jaws is slidably confined on the said beam between the first said jaw and the said stop.

3. A dimension finding instrument as defined in claim 1, in which one of the said jaws carries the said index and is slidably confined on the said beam between the other of said jaws and the said stop.

4. A dimension finding instrument as defined in claim 1, in which each of the said jaws presents two work sensing terminals separated by width of the said terminal portion of the jaw, and the said index is carried by one of the said jaws in a position to register with that one of the said graduations in the said scale denominated a dimensional value equal to one half the combined said widths of said terminal portions of the jaws.

5. A dimension finding instrument as defined in claim 1 in which each of the said jaws presents two work sensing terminals separated by width of the said terminal portion of the jaw, and the said index is carried by one of the said jaws in a position to register with that one of the said graduations in the said scale denominated a dimensional value equal to one half the sum of said widths of said terminal portions of the jaws, said index carrying jaw being slidably confined on the said beam between the other of said jaws and the said stop.

6. A dimension finding instrument as defined in claim 1, in which each of the said jaws presents two work sensing terminals separated by width of the said terminal portion of the jaw, and the said index is carried by one of the said jaws in a position to register with that one of the said graduations in the said scale denominated a dimensional value equal to one half the sum of said widths of said terminal portions of the jaws, the other of said jaws being slidably confined on the said beam between said index carrying jaw and the said stop.

7. A dimension finding instrument as defined in claim 1, in which the said beginning graduation is denominated zero.

8. A dimension finding instrument as defined in claim 7, in which the said index is carried by the said one of said jaws which abuttingly engages the said stop.

9. A dimension finding instrument as defined in claim 7, in which the said index is carried by one of said jaws, and the said stop is abuttingly engaged by the other of said jaws.

10. A dimension finding instrument as defined in claim 1, in which each of the said jaws presents two work sensing terminals separated by width of the said terminal portion of the jaw, and the said index is carried by one of the said jaws in a position to register with that one of the said graduations in the said scale denominated a dimensional value equal to one half the sum of said widths of said terminal portions of the jaws plus the actual distance separating the nearest together of said work sensing terminals when one of the said jaws is in abutting engagement both with the other of said jaws and with the said beam carried stop.

11. A dimension finding instrument as defined in claim 10, in which the said index is carried by the said one of said jaws which abuttingly engages the said stop.

12. A dimension finding instrument as defined in claim 10, in which the said stop is abuttingly engaged by the one of the said jaws which abuttingly engages the said index carrying jaw.

13. A dimension finding instrument affording direct reading of distance between unmarked work loci respectively lying midway between one pair of discernible work marks and midway between a different pair of discernible work marks, including in combination, a straight scale beam, a first calipering jaw carrying in fixed relation thereto the median of width of at least one work sensing terminal of said first jaw and slidably engaged with said beam in a manner to be confined thereby to rectilinear movement for measuring work, a second calipering jaw carrying in fixed relation thereto the median of width of at least one work sensing terminal of said second jaw and slidably engaged with said beam in a manner to be confined thereby to rectilinear movement relative to said beam into and away from abutting engagement with said first jaw for measuring work, mutually registering relatively movable measurement indicators, one of said indicators comprising an index movable in unison with one of said jaws and the other of said indicators comprising a scale of spaced apart graduations carried by said beam ranging serially away from a beginning graduation of said scale and denominated as dimensional values different from but proportional to the true aggregates of spacings of said graduations from said beginning graduation, and a stop fixed on said beam in predetermined relation to said beginning graduation positioned to be engageable by one of said jaws in only one direction of sliding movement of the latter thereby to limit movement of both said jaws relative to said beam in said direction and to permit free independent sliding movement of both said jaws relative to said beam and relative to each other in the opposite direction, said stop being so located on said beam as to bring said index into register with said beginning graduation when said jaws are mutually engaged when said first jaw engages said stop, and said beginning graduation being denominated as the true dimension of the distance that then intervenes between said medians of said work sensing terminals.

References Cited in the file of this patent

UNITED STATES PATENTS

| Number | Name | Date |
|---|---|---|
| 431,702 | Littley | July 8, 1890 |
| 477,105 | Darling | June 14, 1892 |
| 514,685 | Reber | Feb. 13, 1894 |
| 959,974 | Tucker | May 31, 1910 |
| 991,478 | Castro | May 9, 1911 |
| 1,153,785 | Helin | Sept. 14, 1915 |
| 1,341,865 | Solberg | June 1, 1920 |
| 1,650,704 | Gaa | Nov. 29, 1927 |
| 1,672,491 | Horak | June 5, 1928 |
| 2,467,263 | Krisanda | Apr. 12, 1949 |
| 2,498,397 | Daly | Feb. 21, 1950 |
| 2,537,473 | McCusker | Jan. 9, 1951 |

FOREIGN PATENTS

| Number | Country | Date |
|---|---|---|
| 454,578 | France | Apr. 30, 1913 |
| 196,282 | Great Britain | Jan. 10, 1924 |
| 287,002 | Great Britain | Mar. 15, 1928 |
| 123,349 | Austria | June 10, 1931 |
| 92,010 | Sweden | Apr. 14, 1938 |